United States Patent [19]

Rijs

[11] Patent Number: 5,575,714
[45] Date of Patent: Nov. 19, 1996

[54] METHOD AND APPARATUS TO POUR FLUID AROUND FRESH PRODUCE

[75] Inventor: Johannes C. M. Rijs, Boskoop, Netherlands

[73] Assignee: Binair Groep B.V., Moerkapelle, Netherlands

[21] Appl. No.: 385,137

[22] Filed: Feb. 7, 1995

[51] Int. Cl.$^6$ ........................................ F26B 21/02
[52] U.S. Cl. ........................ 454/174; 34/213; 34/215; 34/219; 454/903
[58] Field of Search ........................ 454/174, 183, 454/903, 180; 34/213, 215, 219; 99/476

[56] References Cited

U.S. PATENT DOCUMENTS

| | | | |
|---|---|---|---|
| 2,079,304 | 5/1937 | Polderman | 454/174 |
| 4,934,255 | 6/1990 | McDonnell et al. | 454/174 |
| 5,074,058 | 12/1991 | Handl et al. | 454/174 |
| 5,475,926 | 12/1995 | Bolkestein et al. | 34/200 |

FOREIGN PATENT DOCUMENTS 9201776  5/1994  Netherlands.
1616547  12/1990  U.S.S.R. ........................ 454/174

*Primary Examiner*—Harold Joyce
*Attorney, Agent, or Firm*—Young & Thompson

[57] ABSTRACT

A method and apparatus for providing a stream of fluid around fresh produce, which produce is stored in containers provided with openings in the sides. A consecutive row of a multiplicity of such containers is arranged along a wall some distance from the latter, in such a way that an interspace is formed between the wall and the row. At least one bag which extends along at least one edge of the row is inflated in the interspace by feeding a fluid to the bag, in such a way that the bag produces a seal against the wall on one side and against the row on the other. The fluid fed to the bag flows via outflow openings made in the bag into the interspace and builds up an elevated pressure here. The fluid then flows from the interspace, via the openings in the sides of the container, around the fresh produce. The invention can be used in particular in storage rooms in which rows of containers containing fresh produce can be arranged along opposing side walls. It is particularly advantageous if the inflatable bag, when inflated, is able to form a ring-shaped seal enclosing the interspace on all sides.

37 Claims, 3 Drawing Sheets

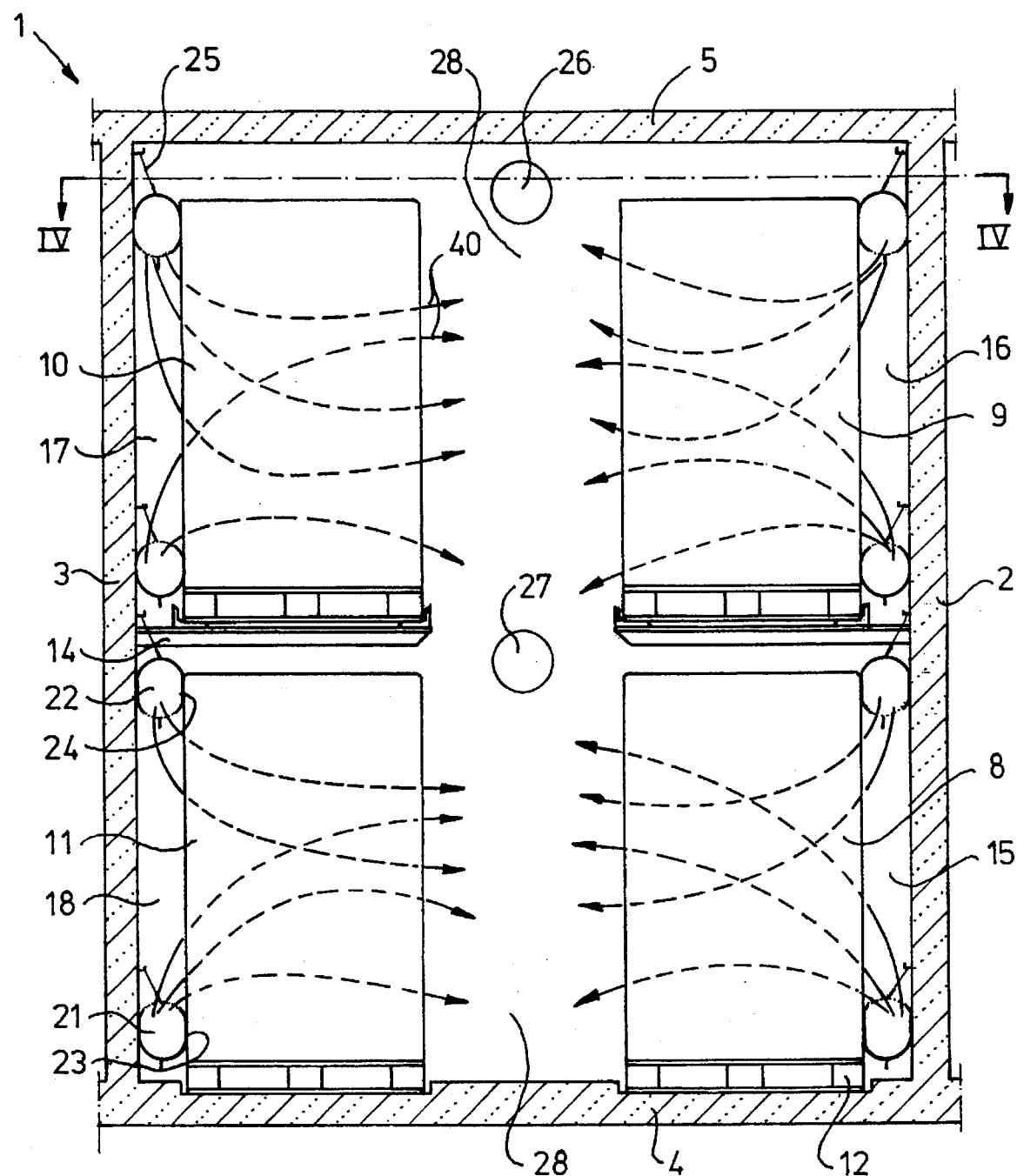

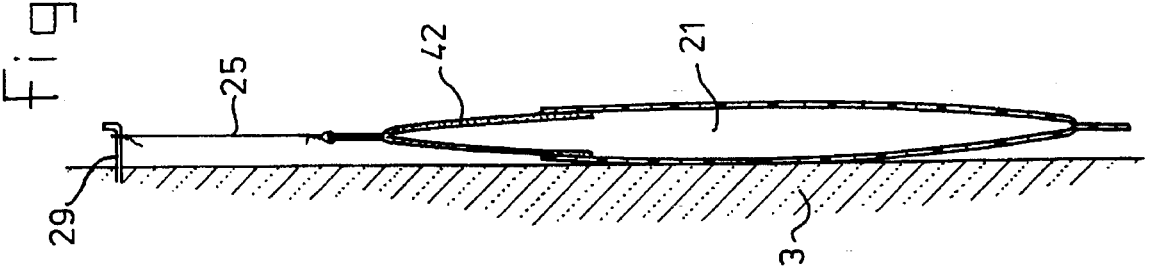
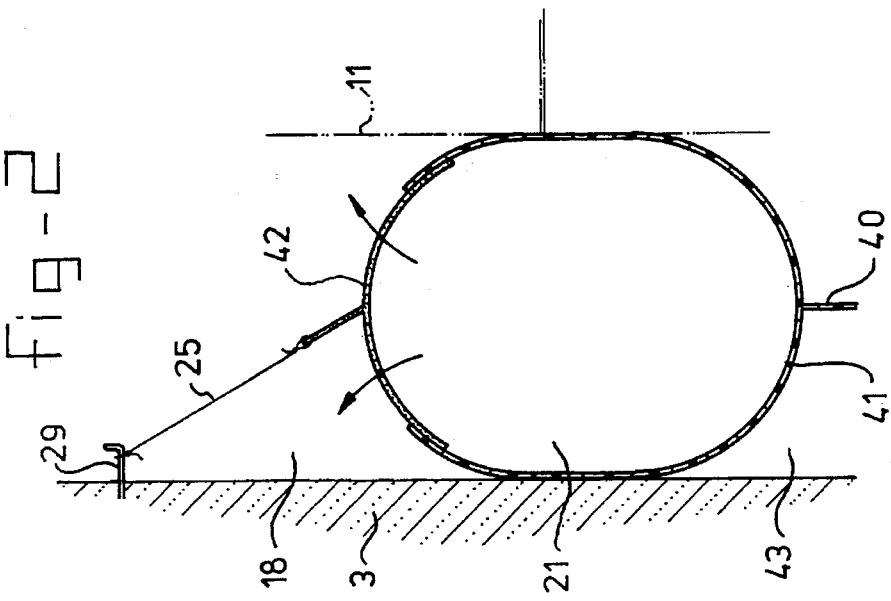

METHOD AND APPARATUS TO POUR FLUID AROUND FRESH PRODUCE

FIELD OF THE INVENTION

The present invention relates to a method and apparatus for providing a stream of fluid around fresh produce, the fresh produce being stored in containers which are provided with openings in the sides and use being made of an inflatable bag.

BACKGROUND OF THE INVENTION

A method and apparatus of this type are disclosed in Netherlands Patent Application 92.01776. This patent application discloses an inflatable bag to be used to provide a seal between a row of laden pallets and the wall of a ripening room. On inflation, inflatable air bags of this type easily adapt to the shape of the passage to be sealed.

Using the method and apparatus according to Netherlands Patent Application 92.01776 a very uniform and controlled stream of fluid can be provided around the fruit to be ripened, but a high ripening room which is able to house two rows of pallets, laden with fruit, arranged above one another is required and, furthermore, a gap is required between the rows of laden pallets arranged above one another, means for cooling and circulating fluid having to be arranged at the height of said gap. This makes the apparatus according to Netherlands Patent Application 92.01776 relatively complex.

OBJECTS OF THE INVENTION

The aim of the present invention is, using relatively simple means, to provide a method and apparatus for providing a stream of fluid around fresh produce, which produce is stored in containers provided with openings in the sides.

A further aim is to provide a method and apparatus of this type which can be used virtually anywhere, in particular in storage rooms for the storage of fresh produce. The method and apparatus according to the invention relate in particular to ripening rooms for ripening fruit, such as bananas, tomatoes, etc.

Yet a further aim of the present invention is to provide a method and apparatus with which the fluid for circulation around the fresh produce is forced via a feed chamber, by means of elevated pressure, to flow around the fresh produce, good sealing of the feed chamber being ensured and, at the same time, the feed of fluid to said feed chamber being ensured.

SUMMARY OF THE INVENTION

In order to realize the above aims, a method is provided, according to the invention, for providing a stream of fluid around fresh produce, which produce is stored in containers provided with openings in the sides, wherein a row of a multiplicity of said containers is arranged along a wall some distance from the latter, in such a way that an interspace is formed between the wall and the row, wherein at least one bag which extends along at least one edge of the row is inflated in said interspace by feeding a fluid to said bag, in such a way that the bag provides a seal against the wall on one side and against the row on the other, wherein the fluid fed to the bag flows via outflow openings made in the bag into the interspace and builds up an elevated pressure here, and wherein the fluid flows from the interspace via the openings in the sides of the containers over the fresh produce.

With this arrangement, the above-mentioned feed chamber for fluid is formed by the interspace between the row of containers and the wall, said interspace being provided with seals along the edges of the row of containers in order to obtain an interspace in which fluid can be collected, which fluid is forced to flow around the fresh produce in the containers. With this arrangement, the seal along the edges of the row which face towards the wall can be realized in numerous ways known from the prior art, but, along at least one longitudinal edge, will comprise one or more inflatable bags extending along said edge. A very good seal can be obtained using an inflatable bag since, on inflation, a bag of this type adapts its shape to the wall and the row with which the bag comes into contact when it is inflated. By further providing the inflatable bag with outflow openings, in such a way that the fluid fed to the bag flows into the interspace, it is possible, in a simple manner, at the same time to achieve a feed for fluid for the purposes of providing a stream of fluid around the fresh produce. An inflatable bag of this type, which is provided with outflow openings, is relatively inexpensive, is easy to fit, provides a good seal and provides very good feeding facilities for fluid. In principle, an inflatable bag can be fitted anywhere where a continuous row of containers is arranged along a wall. If the row of containers is not arranged precisely parallel to the wall, or if the row of containers or wall has an irregular surface, a good seal can nevertheless be achieved using the inflatable bag, since the shape of said bag can be adjusted easily.

The wall against which the row of containers has been or will be arranged can itself also be a row of containers. In this case the inflatable bag is arranged in an interspace between two rows of containers and is inflated until it makes sealing contact with both rows.

With the method according to the invention, it is very readily conceivable that first one, preferably continuous, row of containers is arranged along a wall and, subsequently, at least one inflatable bag is arranged in the interspace produced. Frequently, the inflatable bag will already have been put in place beforehand, for example mounted on the wall, and a row of containers will then be arranged along the wall. Optionally, it is also conceivable to suspend the inflatable bag from cables, in which case, after a row of containers has been arranged, the bag can then be allowed to descend to its position in the interspace by operating the cables on which the bag is suspended.

According to the invention, it is particularly advantageous if, at opposing edges of the row, a bag which extends along said edges between the row and the wall is inflated or has been arranged. If a row has a fixed length or height, the edges determined by the fixed length or height can be sealed easily by means of known sealing means, while the other opposing edges can be sealed in a reliable manner by means of the inflatable bag.

According to the invention, the at least one inflatable bag extends in particular along a horizontal edge.

The inflatable bag used according to the invention will assume a tubular shape when inflated to provide a seal. A tubular inflated bag of this type forms a seal in its longitudinal direction, while internally a channel is formed for the feed of fluid to the outflow openings.

According to a particularly advantageous embodiment, the inflatable bag forms an inflatable channel which extends as an essentially rectangular ring in the peripheral direction of the interspace, and the outflow openings made in the bag are located on the inside of the ring when the bag is inflated. With the aid of a ring-shaped inflatable bag of this type, the interspace formed between the wall and the row of containers can be sealed in a very simple manner over the entire circumference along the edges of the row and fluid for circulation around the fresh produce can be provided via the outflow openings facing towards the interspace.

In order to counteract heat exchange between the interspace and the adjoining environment, it is advantageous, according to the invention, if the at least one inflatable bag is provided with thermal insulation, at least on that side thereof which faces away from the interspace. In this way, it is possible to prevent a fluid which is at a controlled temperature and is intended for circulating around fresh produce from prematurely exchanging heat with the environment, which would have an adverse effect on the energy efficiency.

The method and apparatus according to the invention relate in particular for providing a stream of fluid around fresh produce in a storage room, which produce is stored in containers provided with openings in the sides, wherein at least one row of a multiplicity of containers is arranged in the storage room along opposing side walls at some distance from the latter, in such a way that an interspace is formed between each side wall and the adjoining row and that a central gap is formed between the rows, wherein, in each interspace, at least one bag which extends along at least one edge of the adjoining row is inflated by feeding a fluid to said bag, in such a way that the bag produces a seal against the adjoining side wall on one side and against the adjoining row on the other, wherein the fluid fed to the bags flows via outflow openings made in the bags into the respective interspaces and builds up an elevated pressure in said interspaces, and wherein the fluid flows from the respective interspace via the openings in the sides of the containers around the fresh produce. With this arrangement it is possible, according to the invention, for the fluid fed to the inflatable bags to be sucked from the central gap by means of fluid-transport means, which maintain fluid circulation through the inflatable bags, through the interspaces, around the fresh produce and through the central gap. The fluid-transport means preferably comprise a centrifugal fan.

According to the present invention, with this arrangement at least two rows can advantageously be arranged along each side wall with a vertical interspace between them. In this way it is possible at one and the same time to place four or more rows of pallets laden with fresh produce in a storage room and to produce a stream of fluid around the fresh produce in the containers or the pallets.

The invention also relates in particular to an apparatus for providing a stream of fluid around fresh produce, comprising a wall and a row containing a multiplicity of containers provided with openings in the sides and containing the fresh produce, wherein the row is arranged some distance away from the wall, in such a way that an interspace is present between the wall and the row, wherein at least one inflatable bag extending along at least one edge of the row is arranged in said interspace, which bag, when inflated, produces a seal against the wall on one side and against the row on the other, wherein the inflatable bag is provided, on the side facing towards the interspace, with outflow openings for fluid, wherein the apparatus is further provided with fluid-transport means for feeding a fluid under pressure to the inflatable bag in order to inflate the latter and subsequently to cause the fluid issuing from the outflow openings to flow around the fresh produce.

An apparatus of this type can be produced using simple means. Essentially, the following are required: fluid-transport means, an inflatable bag and a wall along which the row of a multiplicity of containers provided with openings in the sides and containing fresh produce can be arranged.

In the case of an apparatus according to the invention, it is particularly advantageous if the apparatus comprises a storage room which has two opposing side walls, preferably opposing longitudinal walls, each of which can be used as a wall for arranging a row of a multiplicity of containers provided with openings in the sides and containing fresh produce. With this arrangement, the rows are arranged essentially parallel to one another, a free central gap remaining between the rows.

In the case of such an apparatus comprising a storage room, the storage room is preferably provided with a false rear wall, wherein the rows of containers are arranged with the end facing towards the false rear wall, and wherein the false rear wall is provided with at least one fluid inlet which is in communication with the central gap and with fluid outlets in communication with the inflatable bags, and wherein the fluid-transport means are arranged in the essentially closed interspace delimited by the false rear wall.

In the apparatus according to the invention, the inflatable bag is preferably arranged at opposing edges of the row or of each row. The at least one bag per row advantageously extends along a horizontal edge of the row concerned.

In order to prevent heat exchange with the environment, the bag can be provided with thermal insulation on the side which faces away from the interspace.

When inflated and providing a seal, the bag according to the present invention will assume a tubular shape.

According to the invention, simple sealing of the interspace is obtained in an advantageous manner if the bag forms an inflatable channel extending as an essentially rectangular ring in the peripheral direction of the interspace and if the outflow openings made in the bag are located on the inside of the ring when the bag is inflated.

The invention also relates in particular to an inflatable bag which can be used in the method or apparatus according to the invention. An inflatable bag of this type assumes a tubular shape when inflated and on one side is provided with outflow openings in the longitudinal direction of the bag. Preferably, an inflatable bag according to the invention extends in the longitudinal direction in the shape of an essentially rectangular ring, the outflow openings being made on the inside of the ring. In order to prevent heat exchange with the environment, the bag can be provided with thermal insulation at least on that part thereof which is located opposite the outflow openings.

BRIEF DESCRIPTION OF THE DRAWINGS

The invention will be described below with reference to a drawing, in which a few illustrative embodiments of the invention are shown by way of example. In the drawing:

FIG. 1 shows a diagrammatic view, in section along lines I—I from FIG. 4, of a storage room according to the invention;

FIG. 2 shows a diagrammatic view, in cross-section, of an inflatable bag according to the invention when inflated to produce a seal;

FIG. 3 shows a diagrammatic view, in cross-section, of an inflatable bag according to the invention when not inflated;

DETAILED DESCRIPTION OF THE INVENTION

Figure 4:
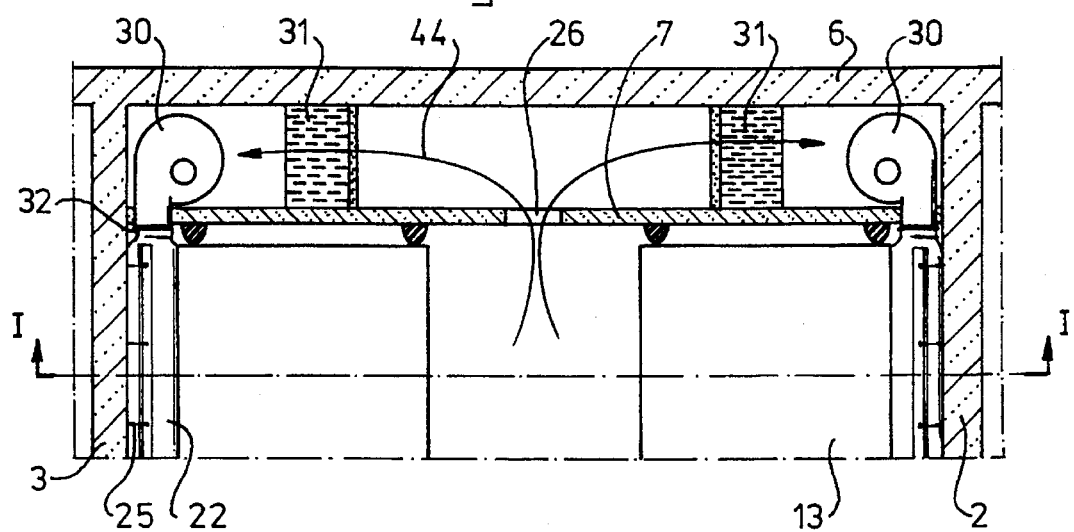
FIG. 4 shows a diagrammatic top view, in section along the lines IV—IV from FIG. 1.

FIG. 1 and FIG. 4 show, diagrammatically, in, respectively, cross-section and part of a longitudinal section, a storage room 1 according to the invention, in particular a ripening room for fruit, such as bananas. The storage room 1 comprises two longitudinal side walls 2 and 3, a floor 4, a ceiling 5, a rear wall 6 and a so-called false rear wall 7. The front wall of the storage room, which is not shown, will contain an access door to enable containers containing fresh produce to be brought into and removed from the storage room and, if required, to permit inspection of the fresh produce.

Four rows 8, 9, 10 and 11, each containing a multiplicity of containers provided with fresh produce, are arranged in the storage room 1. Preferably, the rows are composed of successive pallets 12, with a multiplicity of containers 13 stacked thereon, as is shown diagrammatically by dash-and-dot lines in FIG. 5, which also shows, diagrammatically, openings 60 in the sides of the containers.

Supports 14 are arranged in the storage room 1, so that two rows can be arranged vertically above one another. With this arrangement, some gap will preferably remain between the rows positioned vertically above one another, in order to facilitate handling of the container when loading and unloading in the storage room 1.

As will be evident from FIGS. 1 and 4, the rows 8, 9, 10 and 11 are arranged along the opposing longitudinal side walls 2 and 3, in such a way that an interspace, 15, 16, 17 and 18, respectively, always remains between the rows 8, 9, 10 and 11 and the adjacent longitudinal side wall. At the ends, located at the false rear wall 7, said interspaces are sealed by seals 20. The interspaces will likewise be sealed at the ends of the rows located at the front of the storage room, for example using seals such as the seals 20 at the false rear wall.

As can also be seen from FIG. 1 and FIG. 4, the interspaces are sealed at their top and bottom by means of inflatable bags 21 and 22, respectively. The inflatable bags 21, 22, which when inflated to produce a seal have a tubular shape, extend along, respectively, the lowermost edge 23, facing towards the longitudinal side wall, and the uppermost edge 24, facing towards the longitudinal side wall, of the row of containers.

As can also be seen in FIG. 1, the inflatable bags are suspended by means of suspension cables 25, which are fixed to the relevant adjoining longitudinal side wall. The suspension cables can optionally also be fixed to the ceiling 5.

Furthermore, the rows are arranged in such a way that a free central gap 28 remains between rows 8, 11 and 9, 10 which are adjacent in the horizontal direction.

As can also clearly be seen in FIG. 4, an essentially closed free interspace is present between the false rear wall 7 and rear wall 6. The free interspace is in communication, via inlets 26 and 27 in the false rear wall 7, with the central gaps 28 formed between the rows of containers.

Fluid-transport means 30, in the form of centrifugal pumps, are arranged in the free interspace between the false rear wall 7 and the rear wall 6. The centrifugal pumps draw in fluid via the inlets 26, 27 and heat exchangers 31, which generally are cooling heat exchangers, arranged in the free interspace. The fluid is then fed via the outlets 32 to the inflatable bags 21, 22. The inflatable bags are inflated by the feed fluid until they form a sealing contact with, on one side, the adjacent longitudinal wall and, on the other hand, the adjacent row of containers. When the inflatable bags have been inflated until they produce a seal, the further fluid supplied is able to flow into the interspace via the outflow openings made in the sides of the inflatable bags which face towards the interspaces, and, after a sufficient pressure has built up in the interspaces, to flow back to the central gap 28 via the containers containing the fresh produce. In order to promote the flow around fresh produce in the containers, the containers are provided with side openings 60 (see FIG. 5) in the side walls of the containers oriented in the longitudinal direction of the storage room. The fluid flow from the inflatable bags through the containers over the fresh produce is shown by means of arrows 40 shown as broken lines. The fluid flow from the central gap 28 to the centrifugal pumps 30 is shown by means of arrows 44.

According to FIG. 4, the heat exchangers 31 are arranged between the walls 6 and 7 in front of the fluid-transport means 30. However, it will be clear that the heat exchangers 31 can also be arranged elsewhere in the interspace between the walls 6 and 7. For instance, the heat exchangers 31 can, for example, also be arranged in, in front of or behind the inlet 26 or inlets 26.

FIGS. 2 and 3 show diagrammatically, by means of a detail from FIG. 1, the functioning of an inflatable bag according to the invention. In FIG. 2 the inflatable bag 21 is shown inflated to produce a seal, while FIG. 3 shows the inflatable bag when it is not inflated. The inflatable bag 21 is fixed by means of cords 25 to hooks 29 in the wall 3. The inflatable bag 21 can be provided with a flap 40 at the bottom, to which flap a further cable can be attached in order to ensure good positioning of the inflatable bag.

The inflatable bag 21 is provided with a heat-insulating section 41 and a fluid-permeable section 42, which faces towards the interspace 18. The insulating section 41 prevents heat exchange between the fluid in the bag and the environment 43. The fluid-permeable section 42, which faces towards the interspace, can be made of a fluid-permeable material, for example an air-permeable fabric. The fluid-permeable section 42 can, however, also be made of a material which is not permeable to fluid and in which separate fluid outflow openings have been made. In the case of a fluid-permeable material for the fluid-permeable section 42, the fluid outflow openings are formed by, for example, the pores of the fluid-permeable material. The fluid-permeable section 42 will preferably be designed in such a way that a certain pressure is required for passage of the fluid, which pressure will be exceeded only when the inflatable bag 21 has been sufficiently inflated to provide a good seal between the wall 3, on one side, and the row of containers 11, on the other.

As can also be seen from FIG. 2, when it is inflated to produce a seal, the inflatable bag 21 has a tubular cross-section, which allows fluid to flow through the inflatable bag 21 in the direction perpendicular to the figure in FIG. 2.

The inflatable bag 21 is shown not inflated in FIG. 3. In this case, the bag 21 lies tight against the wall 3 under the influence of its own weight, so the said emptied bag does not hinder the positioning of rows of containers.

Figure 5:
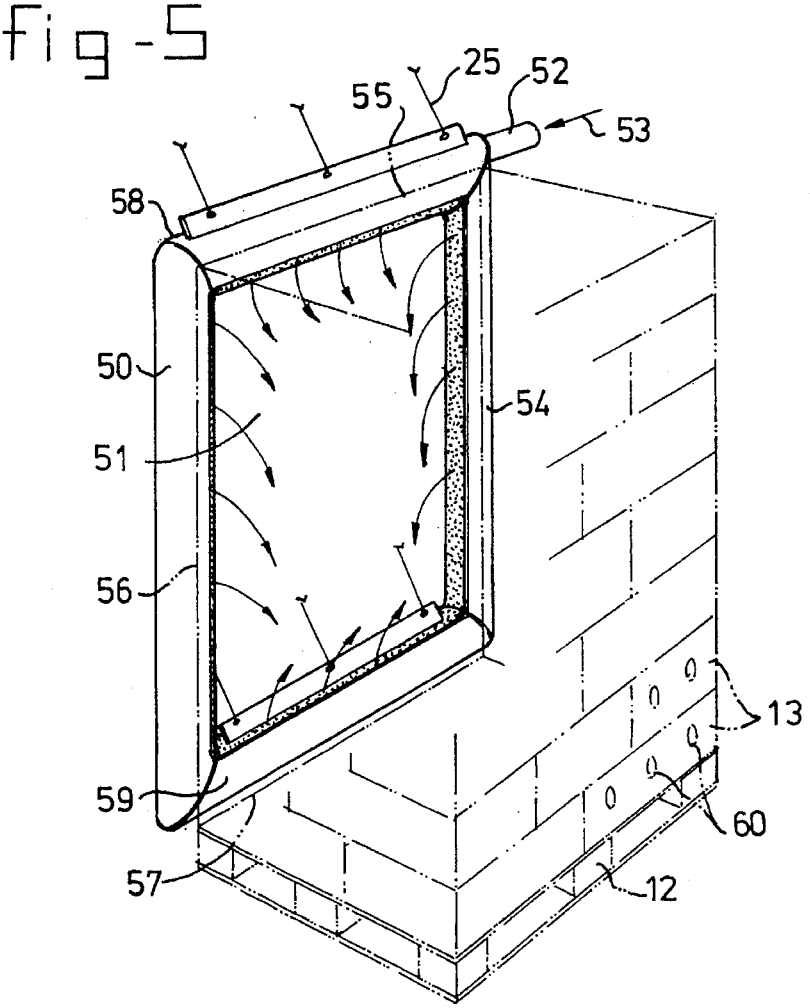
FIG. 5 shows a diagrammatic perspective view of a particular embodiment of an inflatable bag according to the invention.

FIG. 5 shows a particularly advantageous embodiment of an inflatable bag 50 according to the invention. The inflatable bag 50 extends in accordance with an essentially rectangular ring and the outflow openings are made on the inside of the ring, that is to say facing towards the interspace 51 which is to be formed and to be sealed. A pallet with a multiplicity of containers containing fresh produce thereon is also shown diagrammatically in dash-and-dot lines in FIG. 5.

As can clearly be seen in FIG. 5, when fluid 53 is supplied via inlet 52 the inflatable ring-shaped bag 50 will inflate to form a ring-shaped seal for the interspace 51, the ring-shaped inflatable bag 50 coming into contact with, on one side, the adjacent wall and, on the other side, the adjacent containers on the laden pallet 12. The circumferential shape of the ring-shaped inflatable bag 50 then essentially corresponds to the edges 54, 55, 56 and 57 of the load of fresh produce on the pallet 12 which face towards the adjacent wall. The inflatable bag 50 can thus be adapted to the standard dimensions of a load of containers to be placed on a pallet. However, the ring-shaped inflatable bag 50 can also assume a shape such that an interspace delimited between a continuous row of laden pallets and the adjacent wall can be sealed by means of one inflatable ring-shaped bag 55. The horizontal tube parts 58 and 59 of the inflatable ring-shaped bag 50 will increase in length in this case. A ring-shaped inflatable bag 50 of this type can thus be adapted to, in principle, arbitrary dimensions of a row of containers containing fresh produce.

Many variants of the method and apparatus according to the invention are conceivable. For instance, the wall against which the inflatable bag produces a seal on one side when it is inflated can be formed by a further row of containers. In this way, for example, a ripening room containing 2, 3, 4 or even more parallel rows of containers is conceivable, the inflatable bags being arranged in interspaces between two adjacent rows of containers.

I claim:

1. Method for providing a stream of fluid around fresh produce, which produce is stored in containers provided with openings in the sides, which comprises:

arranging a row of a multiplicity of said containers along a wall some distance from the latter, in such a way that an interspace is formed between the wall and the row, inflating at least one bag which extends along at least one edge of the row in said interspace by feeding a fluid to said bag, in such a way that the bag produces a seal against the wall on one side and against the row on the other, flowing the fluid fed to the bag via outflow openings made in the bag into the interspace and building up an elevated pressure in said interspace, and flowing the fluid from the interspace via the openings in the sides of the containers around the fresh produce.

2. Method according to claim 1, wherein at least one bag is arranged in the interspace between the continuous row of containers and the wall.

3. Method according to claim 1, wherein at opposing edges of the row, a bag which extends along said edges between the row and the wall is inflated.

4. Method according to claim 1, wherein the at least one bag extends along a horizontal edge.

5. Method according to claim 1, wherein the at least one bag has a tubular shape when inflated to produce a seal.

6. Method according to claim 1, wherein the bag forms an inflatable channel which extends as an essentially rectangular ring in the peripheral direction of the interspace, and wherein the outflow openings made in the bag are located on the inside of the ring when the bag is inflated.

7. Method according to claim 1, wherein the at least one bag is provided with thermal insulation on a side thereof which faces away from the interspace.

8. Method according to claim 1, wherein the wall is formed by a further row of containers.

9. Method for providing a stream of fluid around fresh produce in a storage room, which produce is stored in containers provided with openings in the sides, which comprises:

arranging at least one row of a multiplicity of containers in the storage room along opposing side walls at some distance from the latter, in such a way that an interspace is formed between each side wall and the adjoining row and that a central gap is formed between the rows, inflating in each interspace, at least one bag which extends along at least one edge of the adjoining row by feeding a fluid to said bag, in such a way that the bag produces a seal against the adjoining side wall on one side and against the adjoining row on the other, flowing the fluid fed to the bags via outflow openings made in the bags into the respective interspaces and building up an elevated pressure in said interspaces, and flowing the fluid from the respective interspace via the openings in the sides of the containers over the fresh produce.

10. Method according to claim 9, wherein the fluid fed to the inflatable bags is sucked from the central gap by fluid-transport means, which maintain fluid circulation through the inflatable bags, through the interspaces, over the fresh produce and through the central gap.

11. Method according to claim 10, wherein the fluid-transport means comprise a centrifugal fan.

12. Method according to claim 9, wherein at least two rows are arranged along each side wall with a vertical interspace between them.

13. Method according to claim 9, wherein at least one bag is arranged in each interspace between the adjoining row and side wall.

14. Method according to claim 9, wherein, at opposing edges of each row, a bag which extends along said edges between the relevant row and the side wall is inflated.

15. Method according to claim 9, wherein the at least one bag extends along a horizontal edge.

16. Method according to claim 9, wherein the at least one bag in each interspace has a tubular shape when inflated to produce a seal.

17. Method according to claim 9, wherein the bag in each interspace forms an inflatable channel which extends as an essentially rectangular ring in the peripheral direction of the interspace, and wherein the outflow openings made in the bag are located on the inside of the ring when the bag is inflated.

18. Method according to claim 9, wherein the at least one bag is provided with thermal insulation on the side thereof which faces away from the interspace.

19. Apparatus for providing a stream of fluid around fresh produce, comprising a wall and a row containing a multiplicity of containers provided with openings in the sides and containing the fresh produce, wherein the row is arranged some distance away from the wall, in such a way that an interspace is present between the wall and the row, wherein at least one inflatable bag extending along at least one edge of the row is arranged in said interspace, which bag, when inflated, produces a seal against the wall on one side and against the row on the other, wherein the inflatable bag is provided, on the side facing towards the interspace, with outflow openings for fluid, wherein the apparatus is further provided with fluid-transport means for feeding a fluid under pressure to the inflatable bag in order to inflate the latter and subsequently to cause the fluid issuing from the outflow openings to flow around the fresh produce.

20. Apparatus according to claim 19, wherein an inflatable bag is arranged at opposing edges of the row.

21. Apparatus according to claim 19, wherein the at least one bag extends along a horizontal edge.

22. Apparatus according to claim 19, wherein the bag is provided with thermal insulation on the side which faces away from the interspace.

23. Apparatus according to claim 19, wherein the at least one bag has a tubular shape when inflated to produce a seal.

24. Apparatus according to claim 19, wherein the bag forms an inflatable channel which extends as an essentially rectangular ring in the peripheral direction of the interspace, and wherein the outflow openings made in the bag are located on the inside of the ring when the bag is inflated.

25. Apparatus according to claim 19, wherein the wall comprises a further row of containers.

26. Apparatus for providing a stream of fluid around fresh produce, comprising a storage room which has two opposing side walls, wherein a row of a multiplicity of containers provided with openings in the sides and containing fresh products is arranged some distance away from each side wall, in such a way that an interspace is present between each side wall and the adjacent row and that a free central gap is present mutually between the rows, wherein at least one inflatable bag extending along at least one edge of the adjoining row is arranged in each interspace, which bag, when inflated, produces a seal against the adjoining side wall on one side and against the adjoining row on the other, wherein the inflatable bags are provided, on their sides facing towards the interspace, with outflow openings for fluid, wherein the apparatus is further provided with fluid-transport means for feeding a fluid under pressure to the inflatable bags in order to inflate the latter and subsequently to cause the fluid issuing from the outflow openings to flow around the fresh produce.

27. Apparatus according to claim 26, wherein an inflatable bag is arranged at opposing edges of the rows.

28. Apparatus according to claim 26, wherein the at least one bag in each interspace extends along a horizontal edge of the adjacent row.

29. Apparatus according to claim 26, wherein each bag is provided with thermal insulation on the side which faces away from the interspace.

30. Apparatus according to claim 26, wherein the bags have a tubular shape when inflated to produce a seal.

31. Apparatus according to claim 26, wherein the bag in each interspace forms an inflatable channel which extends as an essentially rectangular ring in the peripheral direction of the interspace, and wherein the outflow openings made in the bag are located on the inside of the ring when the bag is inflated.

32. Apparatus according to claim 26, wherein the storage room is provided with a false rear wall, wherein the rows of containers are arranged with one end facing towards the false rear wall, wherein the false rear wall is provided with at least one fluid inlet which is in communication with the central gap and with fluid outlets in communication with the inflatable bags, and wherein the fluid-transport means are arranged in the essentially closed interspace delimited by the false rear wall.

33. Apparatus according to claim 26, wherein the fluid-transport means comprise at least one centrifugal fan.

34. Apparatus according to claim 26, wherein at least two rows are arranged along each of the opposing side walls with a vertical interspace between them.

35. Inflatable bag which assumes a tubular shape when inflated, wherein the bag is provided with outflow openings in the longitudinal direction on one side.

36. Inflatable bag according to claim 35, which extends in the longitudinal direction in the shape of an essentially rectangular ring, the outflow openings being made on the inside of the ring.

37. Inflatable bag according to claim 35, wherein the bag is provided with thermal insulation at least on that part thereof which is located opposite the outflow openings.

* * * * *